C. PERKES.
Air-Pumps.
No. 152,765.  Patented July 7, 1874.
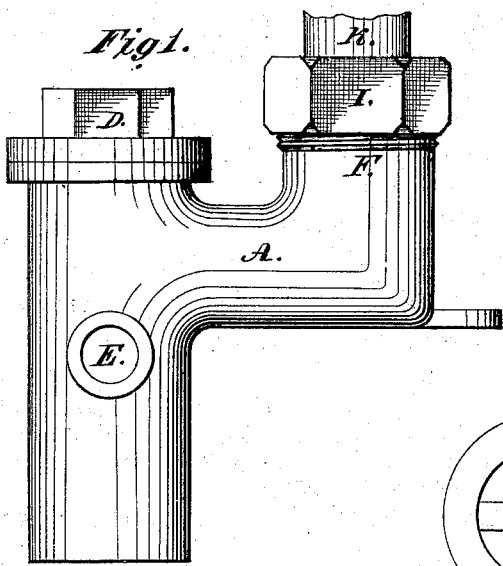
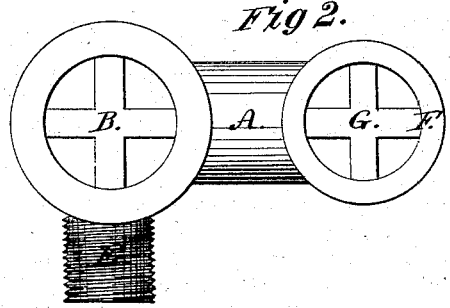
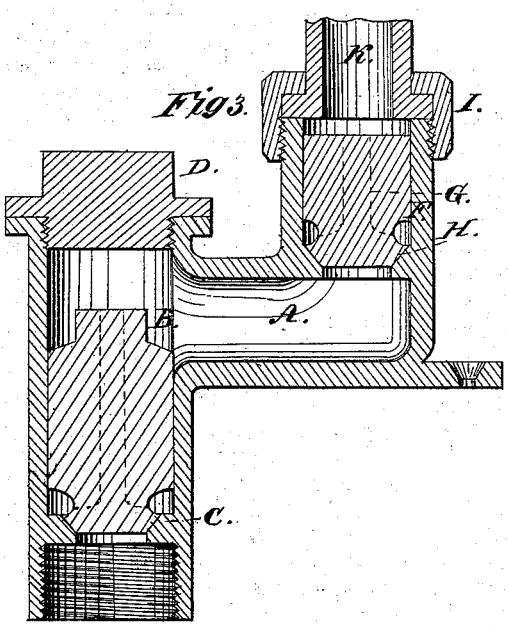
Witnesses:
Walter J Budd.
John B Devine
Inventor:
Charles Perkes

UNITED STATES PATENT OFFICE.

CHARLES PERKES, OF PHILADELPHIA, PENNSYLVANIA.

IMPROVEMENT IN AIR-PUMPS.

Specification forming part of Letters Patent No. 152,765, dated July 7, 1874; application filed May 27, 1874.

*To all whom it may concern:*

Be it known that I, CHARLES PERKES, of the city and county of Philadelphia and State of Pennsylvania, have invented a new and useful Improvement in Valves for Air-Pumps, used in forcing air into casks of malt liquors for drawing the same.

The nature of my invention consists in a peculiar arrangement of valve-body containing the inlet and discharge valve of the pump, by means of which the valves are of very easy access while connected with the pump, and can be readily severed from the pump for repairs and replaced.

The advantage of this arrangement is, that the parts from their construction are not easily deranged, and can be easily removed without deranging other portions of the pump, and, when worn out, are cheaply renewed, and can be properly attached by persons of little mechanical skill.

The following I declare to be a full, clear, and exact description of the mode of making and using this invention, referring in so doing to the drawing annexed and letters of reference marked thereon.

Figure 1 shows an elevation. Fig. 2 shows a plan with the valve cover and coupling removed. Fig. 3 shows a vertical section of the line $x\ x$ in Fig. 2, and Fig. 4 a detached view of the valve.

A represents the valve-body, having an inlet-valve, B, fitting in a seat, C, accessible and removable from above by unscrewing the plug D. A screwed branch, E, opening into the body A above the valve-seat C, serves to attach the apparatus to the base or body of the pump-cylinder. A chamber, marked F, contains the delivery-valve G, which fits in a seat, H. The external upper part of the chamber F is screw-threaded and fitted with a coupling-nut, I, which holds down the swivel K upon the chamber F. The size of the aperture in the swivel K is such that it limits the lifting of the delivery-valve G.

The valve G is shown in a detached view in Fig. 4, and has four projecting wings, which guide it to and from its seat in opening and closing. The inlet-valve B is of similar construction.

The operation of the invention is as follows: When the air is drawn into the pump-barrel through the branch E the valve G is closed and the valve B opens, and when the air is expelled from the barrel through the tube E the valve B closes and the valve G opens, and the air is delivered through the swivel K, and, by means of a suitable tube, (preferably a flexible one,) is conveyed to the cock or other vessel to be charged.

When it is desired to inspect or remove and clean the valve B, the plug D is unscrewed, and, when the valve G requires to be cleaned or inspected, the nut I being unscrewed, access is readily had thereto by removing the swivel K. By unscrewing the nut I the valve-body A may be unscrewed from the pump and detached.

What I claim as my invention, and desire to secure as such by Letters Patent, is—

The valve-body A, having a screwed branch, E, and combined with the valves B and G, plug D, and nut I, and swivel K, constructed as shown and described.

CHARLES PERKES.

Witnesses:
JOHN B. DEVINE,
WALTER J. BUDD.